US012248491B2

(12) United States Patent
Frantz et al.

(10) Patent No.: US 12,248,491 B2
(45) Date of Patent: Mar. 11, 2025

(54) MANAGING ACCESS TO USAGE DATA ON A CLOUD-BASED DATA WAREHOUSE

(71) Applicant: SIGMA COMPUTING, INC., San Francisco, CA (US)

(72) Inventors: Jason D. Frantz, San Francisco, CA (US); Robert C. Woollen, San Rafael, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 17/700,589

(22) Filed: Mar. 22, 2022

(65) Prior Publication Data

US 2023/0306038 A1 Sep. 28, 2023

(51) Int. Cl.
*G06F 17/00* (2019.01)
*G06F 16/25* (2019.01)

(52) U.S. Cl.
CPC .................. *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 8,244,761 | B1* | 8/2012 | Dickens | G06F 21/6218 |
| | | | | 705/51 |
| 9,740,876 | B1* | 8/2017 | Nachenberg | G06F 21/554 |
| 11,694,781 | B1* | 7/2023 | Cook | G06Q 10/10 |
| | | | | 221/1 |
| 2012/0324259 | A1* | 12/2012 | Aasheim | H04W 52/0258 |
| | | | | 713/340 |
| 2013/0254847 | A1* | 9/2013 | Adams | G06F 21/6218 |
| | | | | 726/4 |
| 2014/0129389 | A1* | 5/2014 | Patel | H04L 67/10 |
| | | | | 705/26.62 |
| 2014/0244573 | A1* | 8/2014 | Gonsalves | G06F 16/283 |
| | | | | 707/606 |
| 2015/0071557 | A1* | 3/2015 | Movellan | G06V 40/174 |
| | | | | 382/225 |
| 2016/0050205 | A1* | 2/2016 | Heller | H04L 63/10 |
| | | | | 726/4 |
| 2016/0065616 | A1* | 3/2016 | Srikanth | G06F 21/62 |
| | | | | 726/1 |
| 2016/0328566 | A1* | 11/2016 | Nellamakkada | G06F 16/254 |
| 2017/0039286 | A1* | 2/2017 | Walke | G06F 16/9535 |
| 2017/0201549 | A1* | 7/2017 | Vincent | H04L 67/1097 |
| 2019/0318364 | A1* | 10/2019 | Marascu | G06Q 30/018 |

(Continued)

*Primary Examiner* — Hung D Le

(57) ABSTRACT

Managing access to usage data on a cloud-based data warehouse including storing, by a table manager, usage data for a plurality of organizations in a table within a cloud-base data warehouse; receiving, by the table manager from a first client, a request for usage data for a first organization of the plurality of organizations, wherein the first client is associated with the first organization; and retrieving, by the table manager, the requested usage data for the first organization using a parameterized connection to the cloud-based data warehouse, wherein the parameterized connection provides access to the usage data for the first organization and blocks access to usage data for each other organization in the plurality of organizations.

20 Claims, 5 Drawing Sheets

(56) References Cited

U.S. PATENT DOCUMENTS

| | | | | |
|---|---|---|---|---|
| 2020/0301926 | A1* | 9/2020 | Frantz | G06F 16/24544 |
| 2020/0301938 | A1* | 9/2020 | Gale | G06F 16/254 |
| 2020/0409980 | A1* | 12/2020 | Priestley | G06F 16/211 |
| 2021/0216552 | A1* | 7/2021 | Gale | G06F 16/24552 |
| 2021/0288880 | A1* | 9/2021 | Srinivasan | H04L 41/147 |
| 2022/0044430 | A1* | 2/2022 | Eckman | G06V 20/64 |
| 2022/0207059 | A1* | 6/2022 | Wang | G06N 20/00 |
| 2022/0253788 | A1* | 8/2022 | Hingne | G06F 16/2379 |
| 2022/0269680 | A1* | 8/2022 | Li | H04L 67/1008 |
| 2022/0309104 | A1* | 9/2022 | Armbrust | G06F 16/215 |
| 2022/0329594 | A1* | 10/2022 | Fan | H04L 63/0227 |
| 2023/0177004 | A1* | 6/2023 | Kong | G06F 16/18 |
| | | | | 707/822 |
| 2023/0229672 | A1* | 7/2023 | Gupta | G06F 16/258 |
| | | | | 707/737 |
| 2023/0237052 | A1* | 7/2023 | Devraj | G06F 16/2423 |
| | | | | 707/769 |
| 2023/0259501 | A1* | 8/2023 | Wagner | G06F 11/3457 |
| | | | | 707/741 |
| 2024/0037483 | A1* | 2/2024 | Singh | G06Q 10/08 |
| 2024/0106847 | A1* | 3/2024 | Yadav | H04L 63/1433 |

\* cited by examiner ns*
MANAGING ACCESS TO USAGE DATA ON A CLOUD-BASED DATA WAREHOUSE

BACKGROUND

Field of the Invention

The field of the invention is data processing, or, more specifically, methods, apparatus, and products for managing access to usage data on a cloud-based data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for managing access to usage data on a cloud-based data warehouse including storing, by a table manager, usage data for a plurality of organizations in a table within a cloud-base data warehouse; receiving, by the table manager from a first client, a request for usage data for a first organization of the plurality of organizations, wherein the first client is associated with the first organization; and retrieving, by the table manager, the requested usage data for the first organization using a parameterized connection to the cloud-based data warehouse, wherein the parameterized connection provides access to the usage data for the first organization and blocks access to usage data for each other organization in the plurality of organizations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
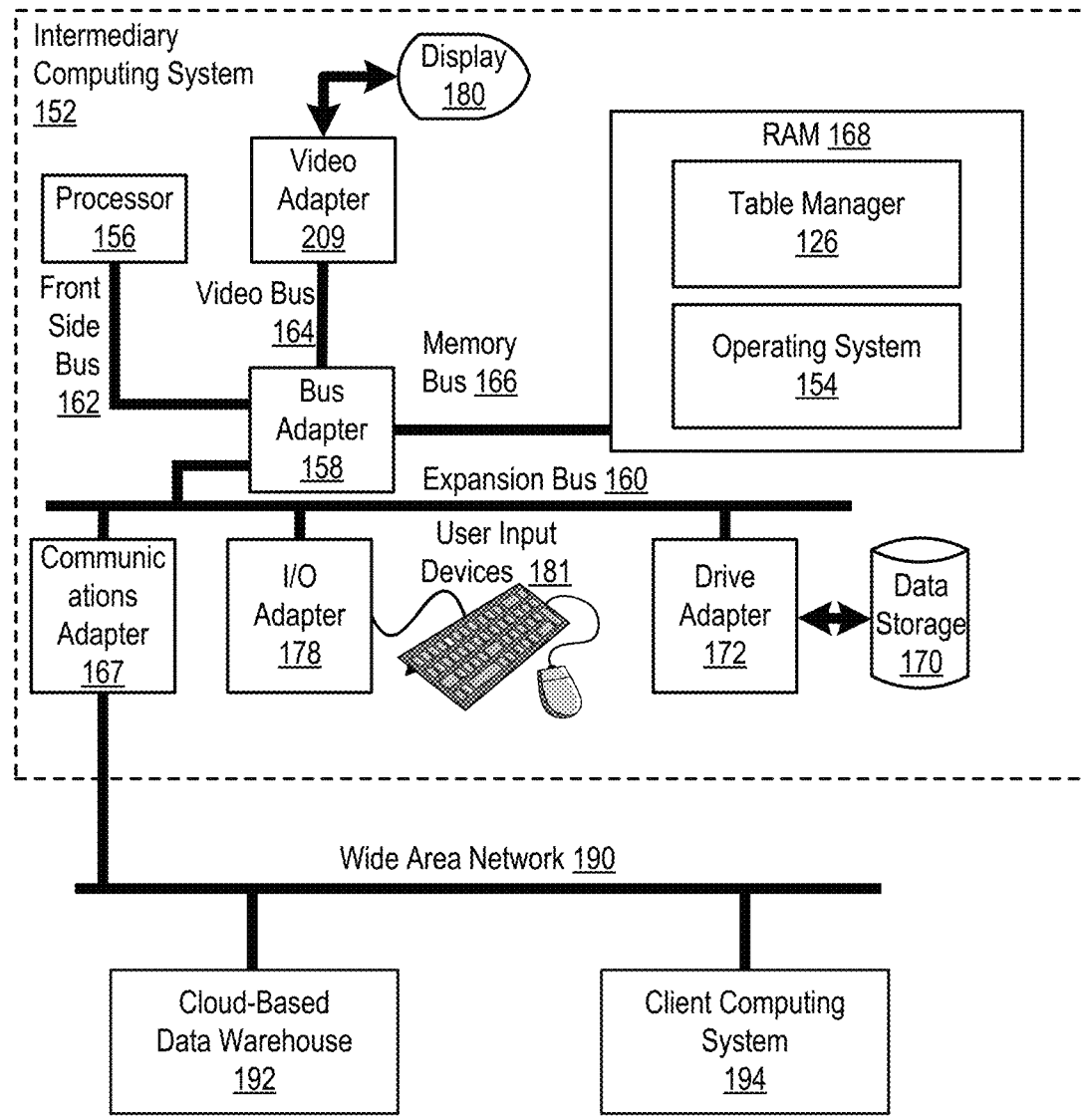
FIG. 1 sets forth a block diagram of an example system configured for managing access to usage data on a cloud-based data warehouse according to embodiments of the present invention.

Exemplary methods, apparatus, and products for managing access to usage data on a cloud-based data warehouse in accordance with the present invention are described with reference to the accompanying drawings, beginning with FIG. 1. FIG. 1 sets forth a block diagram of automated computing machinery comprising an exemplary intermediary computing system 152 configured for managing access to usage data on a cloud-based data warehouse according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for managing access to usage data on a cloud-based data warehouse according to embodiments of the present invention include UNIX™, Linux™, Microsoft Windows™, AIX™ and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for managing access to usage data on a cloud-based data warehouse according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for managing access to usage data on a cloud-based data warehouse according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing access to usage data on a cloud-based data warehouse according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
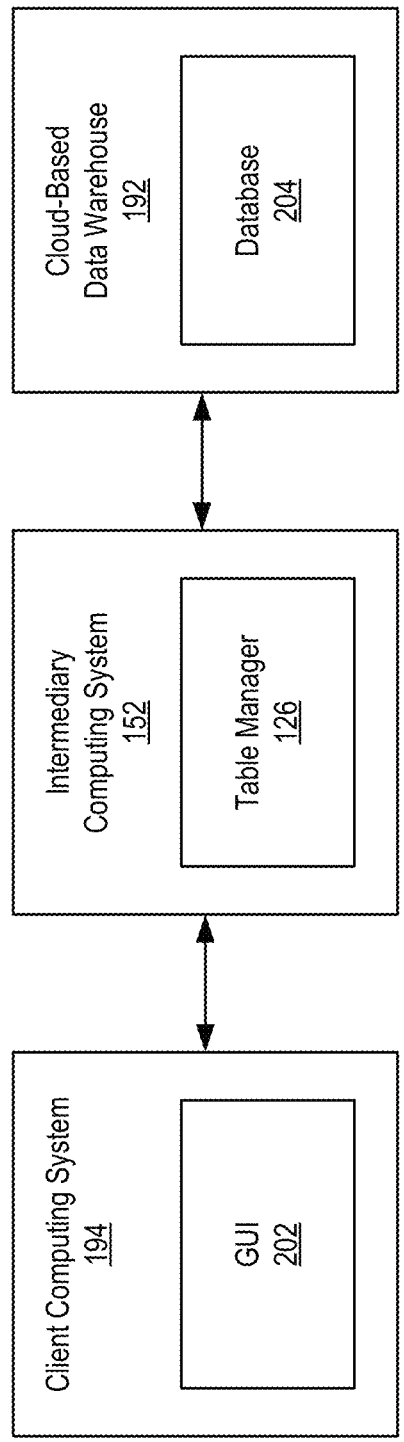
FIG. 2 sets forth a block diagram of an example system configured for managing access to usage data on a cloud-based data warehouse according to embodiments of the present invention.

FIG. 2 shows an exemplary system for managing access to usage data on a cloud-based data warehouse according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126. The cloud-based data warehouse 192 includes a database 204. The client computing system 194 may access the cloud-based data warehouse 192 and database 204 via the table manager on the intermediary computing system 152.

The GUI 202 is a visual presentation configured to present data sets in the form of worksheets, workbooks, and graphical elements to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. Data sets may be sent from the cloud-based data warehouse 192 in response to a database statement (also referred to as a query). Accordingly, data sets retrieved in response to a database statement may be referred to as query results.

The table manager 126 is hardware, software, or an aggregation of hardware and software configured to receive instructions in the form of state specifications from the client computing system 194, via the GUI 202. The table manager 126 is also configured to generate database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data set. Such elements may include filters applied to the worksheet, the hierarchical level of the worksheet, joins performed within the worksheet, exposable parameters in the worksheet, and security for the worksheet.

The table manager 126 uses the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database statement.

The table manager 126 may use the database statement to fetch query results (i.e. a data set) from the database 204. The table manager 126 may then present the query results to a user via the GUI 202. The table manager 126 may further manage tables on the database 202 to which a user has made edits, such as adding new rows or editing existing rows. Further, the table manager 126 may add columns to new rows and create new tables on the database 202.

Figure 3:
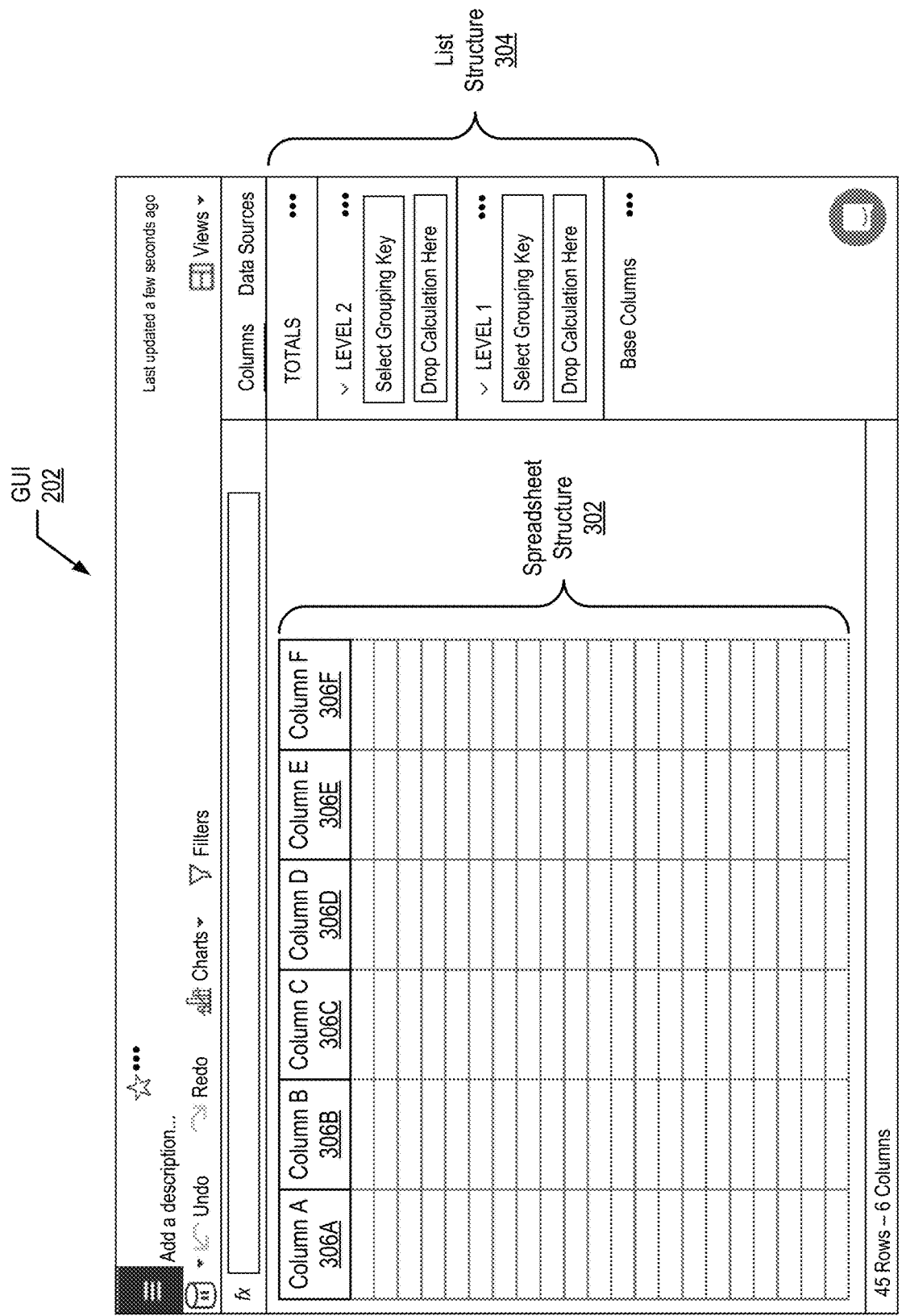
FIG. 3 sets forth a block diagram of an example system configured for managing access to usage data on a cloud-based data warehouse according to embodiments of the present invention.

FIG. 3 shows an exemplary system for managing access to usage data on a cloud-based data warehouse according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F). The combination of a worksheet and dynamic graphic elements may be referred to as a workbook.

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
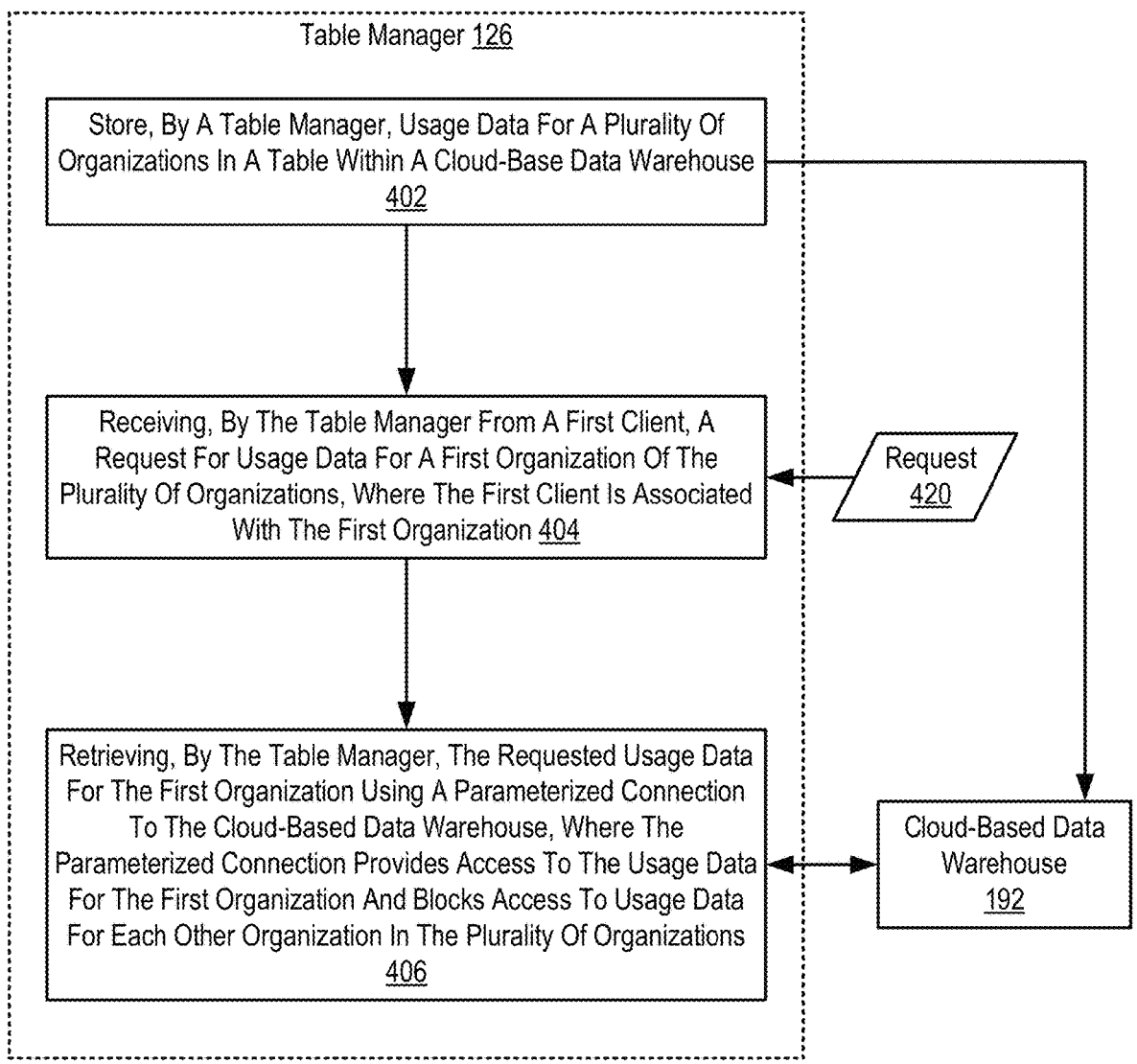
FIG. 4 sets forth a flow chart illustrating an exemplary method for managing access to usage data on a cloud-based data warehouse according to embodiments of the present invention.

For further explanation, FIG. 4 sets forth a flow chart illustrating an exemplary method for managing access to usage data on a cloud-based data warehouse according to embodiments of the present invention that includes storing 402, by a table manager 126, usage data for a plurality of organizations in a table within a cloud-base data warehouse 192. Users associated with each organization may utilize the table manager 126 to access cloud-based data warehouses associated with that user's organization. Specifically, users may utilize the table manager 126 to retrieve and manipulate data stored within databases on the organization's cloud-based data warehouse. Interactions between user and the organization's database(s) facilitated by the table manager 126 may be logged by the table manager 126 in a separate cloud-based data warehouse 192 under the control of the table manager 126. Such interactions are referred to as usage data and may include logins/logouts, queries made, events, schedules, information about user-created tables, information about user teams, information about documents created, etc. Some users of the organization, such as a database administrator, may want access to the usage data created and stored by the table manager 126 on the cloud-based data warehouse 192.

Storing 402 the usage data in the table may be carried out by monitoring activities (i.e., interactions between users and the table manager 126) for each user associated with each of the plurality of organizations and storing information about the monitored activities in at least one table within the database on the cloud-based data warehouse under the control of the table manager 126. The usage data may be stored across multiple tables within the database. For example, one table may store logins, another may store logouts, etc. Further, each table may include usage data for multiple organizations. The table manager 126 may provide access to the usage data for one organization without also disclosing usage data for the other organizations stored on the same table.

An organization is a group of users that utilize the table manager 126 to access one or more databases under the control of the organization. Each member of the organization may have credentials to access the table manager 126 and authorization (either direct or via the table manager) to access one or more databases under the control of the organization. The organization may be a company and the users may be employees of that company.

The method of FIG. 4 also includes receiving 404, by the table manager 126 from a first client, a request 420 for usage data for a first organization of the plurality of organizations, wherein the first client is associated with the first organization. Receiving 404 the request 420 for usage data for the first organization may be carried out by detecting that a user has manipulated elements of the GUI and/or submitted data using the GUI such that the generation of the request 420 is triggered, and the request 420 is sent to the table manager 126. The request 420 may be received in the form of a state specification from the GUI. Specifically, each change to the GUI may result in a new or updated state specification 420 that operates as an request to the table manager 126.

The first client may be associated with the first organization in a variety of ways. For example, the first client may be a member of the first organization, such as an employee of the organization company. Alternatively, the first client may be authorized by the first organization to access the usage data for the first organization. Further, the first client may be utilizing a client computing system communicatively coupled to an intermediary computing system hosting the table manager 126.

The request 420 for usage data for the first organization may include an instruction to manipulate the usage data for the first organization. Manipulating the usage data may include executing operations on the data set of usage data requested. Such operations may include calculations utilizing elements of the data set as inputs, combining elements from different tables, or other database operations.

The method of FIG. 4 also includes retrieving 406, by the table manager 126, the requested usage data for the first organization using a parameterized connection to the cloud-based data warehouse 192, wherein the parameterized connection provides access to the usage data for the first organization and blocks access to usage data for each other organization in the plurality of organizations. The parameterized connection provides access to the cloud-based data warehouse 192 by the table manager 126 and is presented to the first client as though the connection were under the first client's control. The first client initiates retrieval of usage data through the parameterized connection as though the first client has unlimited access to the cloud-based data warehouse. However, the parameterized connection limits access to only the portions of the tables associated with the first organization.

The parameterized connection filters out the usage data for each other organization in the plurality of organizations. Specifically, the parameterized connection may apply filters or other limitations on the request from the first client. The filters or other limitations ensure that the first client is only given access to the usage data for the first organization. For example, the first client may request all rows of a login table. In response, the table manager 126 transmits the request via the parameterized connection, which limits the request to only the portions of the login table for the first client's organization.

Retrieving 406 the requested usage data for the first organization using the parameterized connection may be carried out by submitting credentials to the cloud-based data warehouse to authenticate the table manager 126 and enable the table manager to retrieve the requested usage data. The credentials used to access the cloud-based data warehouse using the parameterized connection may be credentials that authenticate the table manager 126 (as opposed to the first client). Specifically, the first client may not have access to the cloud-based data warehouse 192 because the cloud-based data warehouse is under the control of the table manager 126. The table manager provides access to the cloud-based data warehouse 192 using the parameterized connection, thereby limiting the access granted to the first client to only portions of the tables on the database related to the first organization. Once the usage data is retrieved by the table manager 126, the table manager 126 provides the usage data to the first client via the GUI on the client computing system.

Subsequent to servicing the request from the first client, a second client may request usage data for a second organization. The table manager 126 may again proceed using the steps described above. Specifically, the table manager 126 may then retrieve the requested usage data for the second organization using a different parameterized connection that limits the access granted to the second client to only portions of the tables on the database related to the second organization. The first and second clients may request the same data set from the same table on the database, but through parameterized connections unique to each client, the first and second clients each receive entirely different query results which do not overlap.

The above limitations improve the operation of the computer system by providing access to usage data for different organizations from the same tables and database while maintaining a separation between different usage data for different organizations. This is accomplished using different parameterized connections for each organization and associated clients. The parameterized connections limit the client's access to only the usage data for that client's organization.

Figure 5:
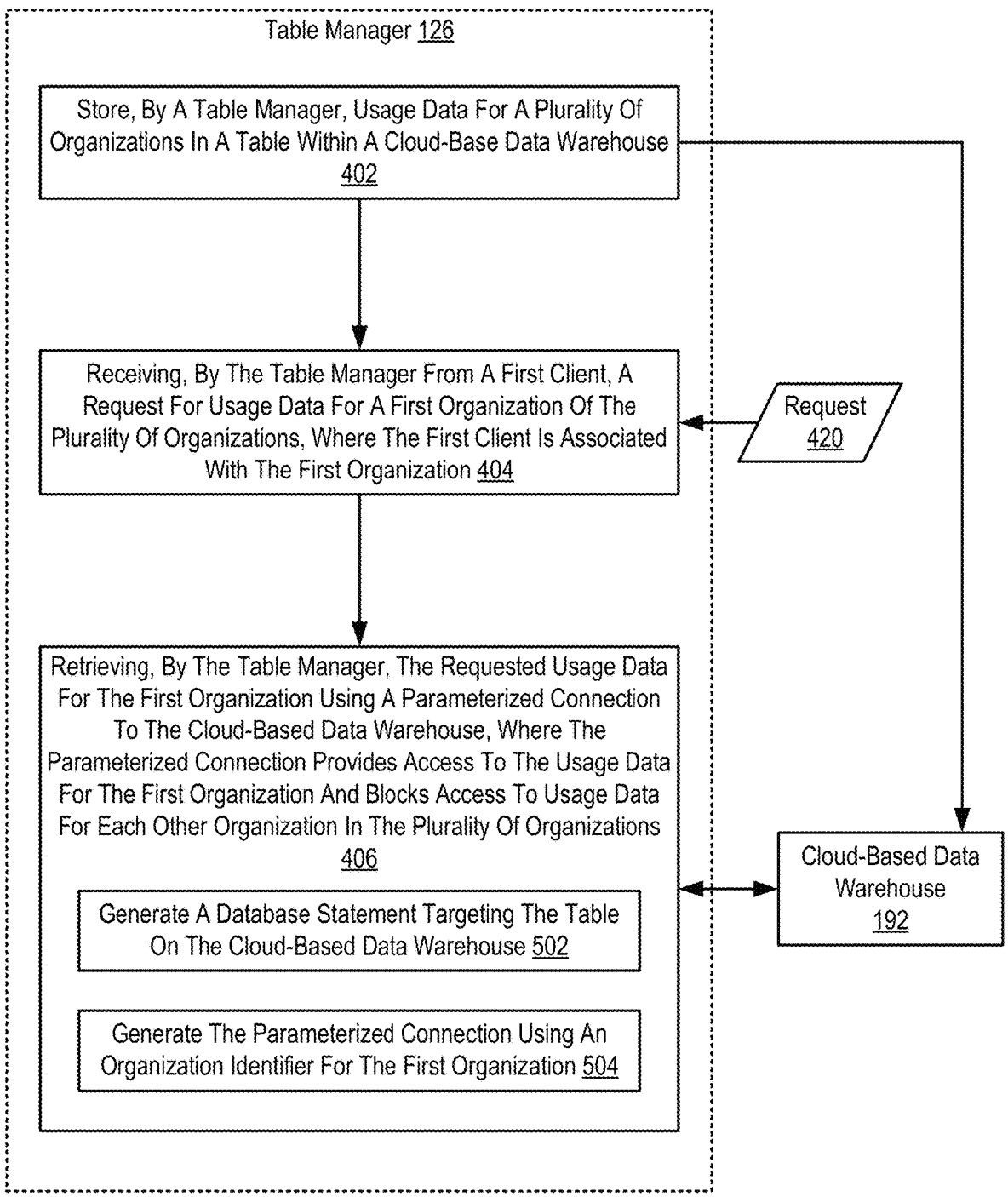
FIG. 5 sets forth a flow chart illustrating an exemplary method for managing access to usage data on a cloud-based data warehouse according to embodiments of the present invention.

For further explanation, FIG. 5 sets forth a flow chart illustrating a further exemplary method for managing access to usage data on a cloud-based data warehouse according to embodiments of the present invention that includes storing 402, by a table manager 126, usage data for a plurality of organizations in a table within a cloud-base data warehouse 192; receiving 404, by the table manager 126 from a first client, a request 420 for usage data for a first organization of the plurality of organizations, wherein the first client is associated with the first organization; and retrieving 406, by the table manager 126, the requested usage data for the first organization using a parameterized connection to the cloud-based data warehouse 192, wherein the parameterized connection provides access to the usage data for the first organization and blocks access to usage data for each other organization in the plurality of organizations.

The method of FIG. 5 differs from the method of FIG. 4, however, in that retrieving 406, by the table manager 126, the requested usage data for the first organization using a parameterized connection to the cloud-based data warehouse 192 further includes generating 502 a database statement targeting the table on the cloud-based data warehouse 192; and generating 504 the parameterized connection using an organization identifier for the first organization.

Generating 502 a database statement targeting the table on the cloud-based data warehouse 192 may be carried out by lowering the received request 420 into a database statement. The received request 420 may be converted into various intermediary forms, such as the abstract syntax tree, canonicalized hierarchy, worksheet algebra, and relational algebra described above. Once generated, the database statement is issued to the cloud-based data warehouse 192 and in response, the cloud-based data warehouse provides the usage data in the form of query results. The database statement may be a structured query language statement.

Generating 504 the parameterized connection using an organization identifier for the first organization may be carried out by retrieving the organization identifier for the organization associated with the first client. The organization identifier may be received in the request 420 or may be part of the authentication of the first client to the table manger 126. Alternatively, the table manager 126 may maintain a data structure that maps clients to organization identifiers. The organization identifier may then be used to set filters or other limitations in the parameterized connection that prevents the client from retrieving any usage data that is not associated with that client's organization.

In view of the explanations set forth above, readers will recognize that the benefits of managing access to usage data on a cloud-based data warehouse according to embodiments of the present invention include:

Improving the operation of the computer system by providing access to usage data for different organizations from the same tables and database, increasing system functionality.

Improving the operation of a computing system by maintaining a separation between different usage data for different organizations stored on the same tables and database, decreasing system complexity and increasing resiliency.

Exemplary embodiments of the present invention are described largely in the context of a fully functional computer system for managing access to usage data on a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for managing access to usage data on a cloud-based data warehouse, the method comprising:
   storing, by a table manager, usage data for a plurality of organizations in a table within a cloud-base data warehouse, including:
      monitoring activities for each user associated with each of the plurality of organizations; and
      storing information about the monitored activities as usage data in the table within the cloud-based data warehouse;
   receiving, by the table manager from a first client, a request for usage data for a first organization of the plurality of organizations, wherein the first client is associated with the first organization; and
   retrieving, by the table manager, the requested usage data for the first organization using a parameterized connection to the cloud-based data warehouse, wherein the parameterized connection provides access to the usage data for the first organization and blocks access to usage data for each other organization in the plurality of organizations.

2. The method of claim 1, wherein retrieving, by the table manager, the requested usage data for the first organization comprises generating a database statement targeting the table on the cloud-based data warehouse.

3. The method of claim 1, wherein retrieving, by the table manager, the requested usage data for the first organization comprises generating the parameterized connection using an organization identifier for the first organization.

4. The method of claim 1, wherein the request for usage data for the first organization comprises an instruction to manipulate the usage data for the first organization.

5. The method of claim 1, wherein the parameterized connection filters out the usage data for each other organization in the plurality of organizations.

6. The method of claim 1, wherein the usage data for a plurality of organizations comprises information about interactions between members of each organization and the table manager.

7. The method of claim 1, wherein credentials used to access the cloud-based data warehouse using the parameterized connection authenticate the table manager.

8. The method of claim 1, wherein the table manager is on an intermediary computing system between the cloud-based data warehouse and the computing system sending the request for usage data.

9. The method of claim 1, wherein the first client does not have access to the cloud-based data warehouse.

10. The method of claim 1, wherein the table is one of a plurality of tables storing usage data for the plurality of organizations.

11. An apparatus for managing access to usage data on a cloud-based data warehouse, the apparatus comprising a computer processor, a computer memory operatively coupled to the computer processor, the computer memory having disposed within it computer program instructions that, when executed by the computer processor, cause the apparatus to carry out the steps of:
   storing, by a table manager, usage data for a plurality of organizations in a table within a cloud-base data warehouse, including:
      monitoring activities for each user associated with each of the plurality of organizations; and
      storing information about the monitored activities as usage data in the table within the cloud-based data warehouse;
   receiving, by the table manager from a first client, a request for usage data for a first organization of the plurality of organizations, wherein the first client is associated with the first organization; and
   retrieving, by the table manager, the requested usage data for the first organization using a parameterized connection to the cloud-based data warehouse, wherein the parameterized connection provides access to the usage data for the first organization and blocks access to usage data for each other organization in the plurality of organizations.

12. The apparatus of claim 11, wherein retrieving, by the table manager, the requested usage data for the first organization comprises generating a database statement targeting the table on the cloud-based data warehouse.

13. The apparatus of claim 11, wherein retrieving, by the table manager, the requested usage data for the first organization comprises generating the parameterized connection using an organization identifier for the first organization.

14. The apparatus of claim 11, wherein the request for usage data for the first organization comprises an instruction to manipulate the usage data for the first organization.

15. The apparatus of claim 11, wherein the parameterized connection filters out the usage data for each other organization in the plurality of organizations.

16. The apparatus of claim 11, wherein the usage data for a plurality of organizations comprises information about interactions between members of each organization and the table manager.

17. The apparatus of claim 11, wherein credentials used to access the cloud-based data warehouse using the parameterized connection authenticate the table manager.

18. The apparatus of claim 11, wherein the table manager is on an intermediary computing system between the cloud-based data warehouse and the computing system sending the request for usage data.

19. The apparatus of claim 11, wherein the first client does not have access to the cloud-based data warehouse.

20. A computer program product for managing access to usage data on a cloud-based data warehouse, the computer program product disposed upon a computer readable medium, the computer program product comprising computer program instructions that, when executed, cause a computer to carry out the steps of:
   storing, by a table manager, usage data for a plurality of organizations in a table within a cloud-base data warehouse, including:
      monitoring activities for each user associated with each of the plurality of organizations; and
      storing information about the monitored activities as usage data in the table within the cloud-based data warehouse;
   receiving, by the table manager from a first client, a request for usage data for a first organization of the plurality of organizations, wherein the first client is associated with the first organization; and
   retrieving, by the table manager, the requested usage data for the first organization using a parameterized connection to the cloud-based data warehouse, wherein the parameterized connection provides access to the usage data for the first organization and blocks access to usage data for each other organization in the plurality of organizations.

\* \* \* \* \*